United States Patent
Asawa et al.

(10) Patent No.: US 10,922,205 B2
(45) Date of Patent: Feb. 16, 2021

(54) MONITORING APPLICATIONS RUNNING ON CONTAINERS

(71) Applicant: VMWARE, INC., Palo Alto, CA (US)

(72) Inventors: Aayush Asawa, Bengaluru (IN); Akshay Bhandari, Bengaluru (IN); Gaurav Gupta, Bangalore (IN)

(73) Assignee: VMWARE, INC., Palo Alto, CA (US)

(*) Notice: Subject to any disclaimer, the term of this patent is extended or adjusted under 35 U.S.C. 154(b) by 630 days.

(21) Appl. No.: 15/683,810

(22) Filed: Aug. 23, 2017

(65) Prior Publication Data
US 2018/0336113 A1 Nov. 22, 2018

(30) Foreign Application Priority Data
May 16, 2017 (IN) .............................. 201741017168

(51) Int. Cl.
G06F 11/34 (2006.01)
G06F 11/30 (2006.01)
G06F 9/455 (2018.01)

(52) U.S. Cl.
CPC ...... *G06F 11/3409* (2013.01); *G06F 9/45558* (2013.01); *G06F 11/302* (2013.01); *G06F 9/455* (2013.01); *G06F 2009/45591* (2013.01)

(58) Field of Classification Search
CPC .................................................. G06F 11/3409
USPC ......................................................... 702/186
See application file for complete search history.

(56) References Cited

U.S. PATENT DOCUMENTS

| | | | |
|---|---|---|---|
| 10,489,179 B1* | 11/2019 | Mackay | G06F 9/45558 |
| 2014/0280894 A1 | 9/2014 | Reynolds et al. | |
| 2016/0162320 A1* | 6/2016 | Singh | G06F 9/5055 718/1 |
| 2017/0257424 A1 | 9/2017 | Neogi et al. | |
| 2019/0235906 A1 | 8/2019 | Ksawa et al. | |

* cited by examiner

*Primary Examiner* — Ricky Ngon
(74) *Attorney, Agent, or Firm* — Patterson + Sheridan LLP

(57) ABSTRACT

Embodiments disclosed herein relate to a method, system, and computer-readable medium for monitoring an application executing across a plurality of containers on a computing system. A performance monitor requests a list of containers created on the computing system. The performance monitor retrieves information associated with a creation of each container in the list. The performance monitor parses the information associated with each container in the list to identify a cluster of related containers that are running the applications. The performance monitor associates the cluster of related containers with the application. The performance monitor assesses a health of the application based on metrics collected from the identified cluster of containers.

20 Claims, 6 Drawing Sheets

MONITORING APPLICATIONS RUNNING ON CONTAINERS

RELATED APPLICATION

Benefit is claimed under 35 U.S.C. 119(a)-(d) to Foreign Application Serial No. 201741017168 filed in India entitled "MONITORING APPLICATIONS RUNNING ON CONTAINERS", filed on May 16, 2017 by VMware, Inc., which is herein incorporated in its entirety by reference for all purposes.

BACKGROUND

Computer virtualization is a technique that involves encapsulating a physical computing machine platform into virtual machine(s) executing under control of virtualization software on a hardware computing platform or "host." A virtual machine provides virtual hardware abstractions for processor, memory, storage, and the like to a guest operating system. The virtualization software, also referred to as a "hypervisor," includes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Virtual machines provide for hardware-level virtualization. Another virtualization technique is operating system-level (OS-level) virtualization, where an abstraction layer is provided on top of a kernel of an operating system executing on a host computer. Such an abstraction is referred to herein as a "container." A container executes as an isolated process in user-space on the host operating system (referred to as the "container host") and shares the kernel with other containers. A container relies on the kernel's functionality to make use of resource isolation (processor, memory, input/output, network, etc.).

Performance monitoring has become increasingly important because performance monitoring aids in troubleshooting a virtualized environment. As systems become more complex, the importance of providing customers with a scalable method that retrieves data and an easy way to analyze that data rises. Performance monitoring tools currently available typically provide the computation metrics for the individual containers themselves, but not for the applications running thereon, Because containers (e.g., stateless containers) are short lived, information directed to the containers are not of much importance.

SUMMARY

Embodiments disclosed herein relate to a method, system, and computer-readable medium for monitoring an application executing across a plurality of containers on a computing system A performance monitor requests a list of containers created on a computing system. The performance monitor retrieves information associated with a creation of each container in the list. The performance monitor parses the information associated with the creation of each container in the list to identify a cluster of related containers. The containers are considered related if the containers are running the same application. The performance monitor associates the cluster of related containers with the application. The performance monitor assesses a health of the application based on metrics collected from the identified cluster of containers.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
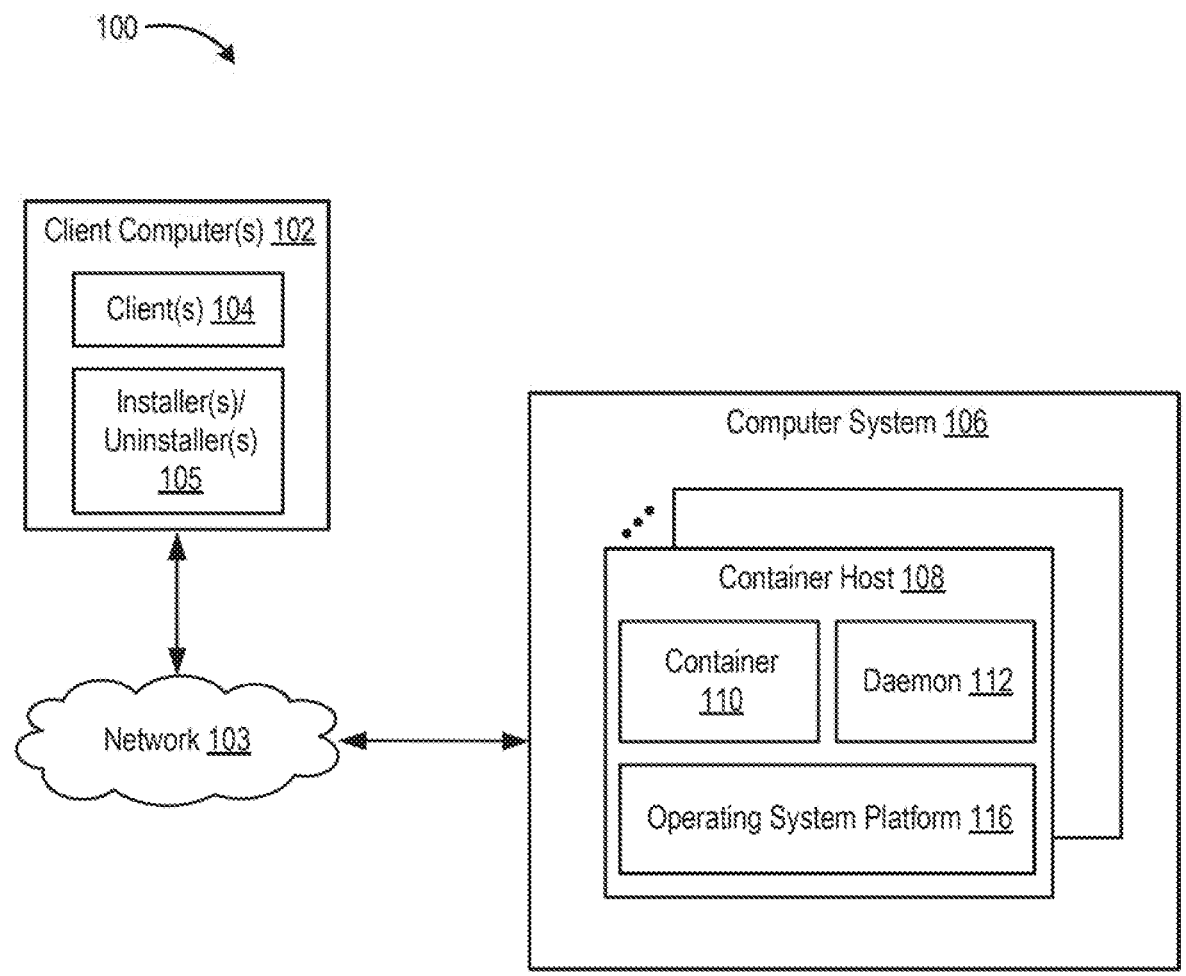
FIG. 1 is a block diagram depicting a computing system according to an embodiment.

FIG. 1 is a block diagram depicting a computing system 100 according to an embodiment. Computing system 100 includes one or more client computers ("client computer(s) 102", network 103, and computer system 106 Client computer(S) 102 execute one or more client applications ("client(s) 104"). Client computer(s) 102 communicate with computer system 106 through network 103.

Computer system 106 supports one or more container hosts 108. In an embodiment, container host 108 may be a virtualized host, such as a virtual machine (VM), executing on a physical host. Each container host 108 includes an agent 112, one or more containers ("container(s) 110"), and operating system (OS) platform 116. Container host(s) 108 can be managed (e.g., provisioned, started, stopped, removed) using installer(s)/uninstaller(s) 105 executing on client computer(s) 102. In one embodiment, container host 108 may be a physical computer, such as a desktop computer, a mobile device, or the like. A container 110 may include binaries, configuration settings, and resource constraints (e.g., assigned processor, memory, and network resources).

Agent 112 provides an interface to computer system 106 for the creation of container(s) 110. Agent 112 provides an application programming interface (API) endpoint for container host 108. Client(s) 104 communicate with agent 112 to build, run, stop, update, and delete containers 110. Client(s) 104 can be any type of existing client for managing conventional containers, such as a Docker client. Agent 112 interfaces with computer system 106 to provision, start, stop, update, and delete containers 110. Agent 112 can also interface with containers 110 to control operations performed therein, such as launching processes, streaming standard output/standard error, setting environment variables, and the like.

Figure 2:
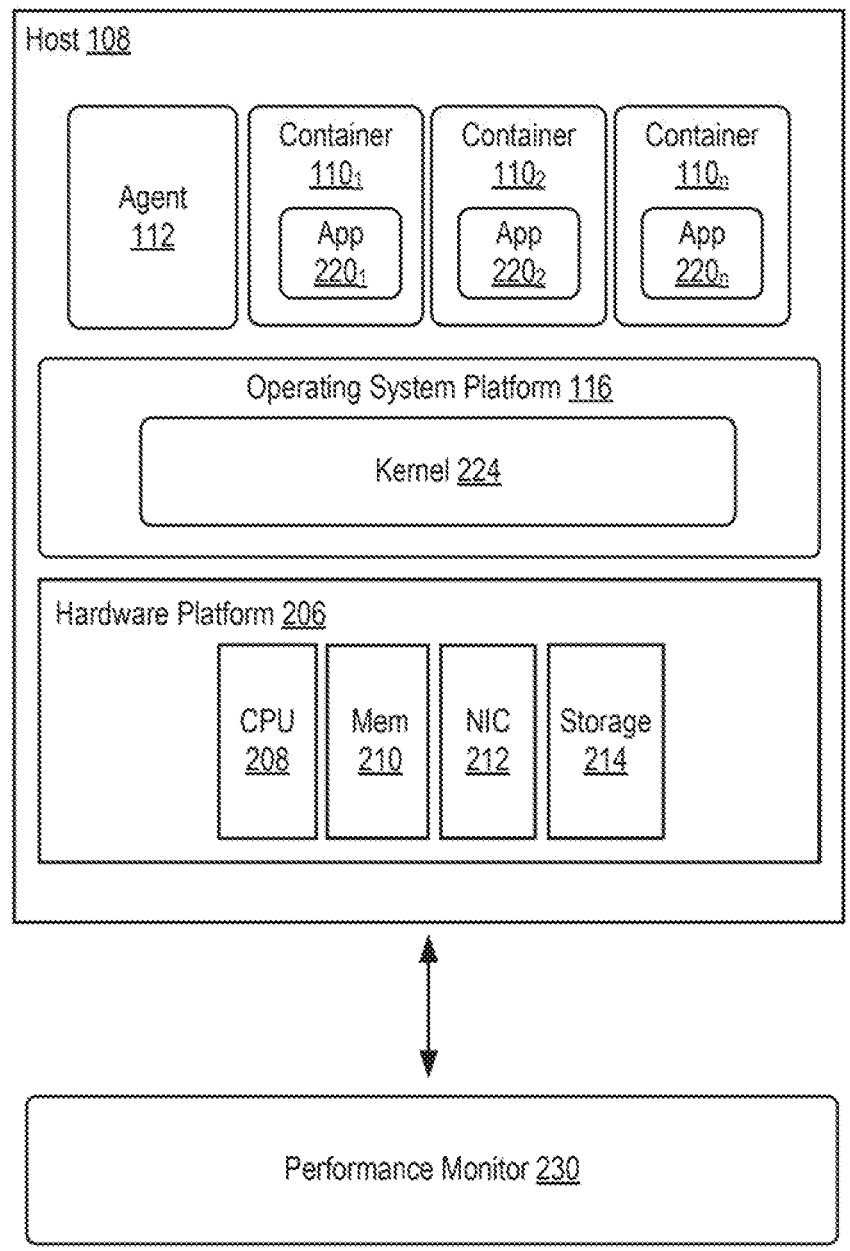
FIG. 2 is a block diagram depicting an embodiment of a container host from the computing system of FIG. 1, according to an embodiment.

FIG. 2 is a block diagram depicting an embodiment of a container host 108. Computer system 106 includes a host computer ("host 108"). Host 108 includes a hardware platform 206. As shown, hardware platform 206 includes conventional components of a computing device, such as one or more processors (CPUs) 208, system memory 210, a network interface 212, storage system 214, and other I/O devices such as, for example, a mouse and keyboard (not shown), CPU 208 is configured to execute instructions, for example, executable instructions that perform one or more operations described herein and may be stored in memory 210 and in local storage. Memory 210 is a device allowing information, such as executable instructions and data to be stored and retrieved. Memory 210 may include, for example, one or more random access memory (RAM) modules, Network interface 212 enables host 108 to communicate with another device via a communication medium. Network interface 212 may be one or more network adapters, also referred to as a Network Interface Card (NIC). Storage system 214 represents local storage devices (e.g., one or more hard disks, flash memory modules, solid-state disks, and optical disks) and/or a storage interface that enables host 108 to communicate with one or more network data storage systems. Examples of a storage interface are a host bus adapter (HBA) that couples host 108 to one or more storage arrays, such as a SAN or a NAS, as well as other network data storage systems.

Host 108 further includes an operating system platform 116. Operating system platform 116 provides a virtualization layer that allows multiple containers 110 to share resources of an operating system (OS) ("operating system-level virtualization"), The processes carried out by the multiple containers 110 are isolated in the underlying operating system. Operating system platform includes kernel 224. Each container 110 runs on top of kernel 224, which enables sharing of OS resources of host 108 by containers 110. In general, clients can use the API provided by the agent 112 to manage containers 110, such as provisioning, starting, stopping, and deleting containers. In an embodiment, a user interacts with agent 112 through an API using client software executing on client computer 102 to create or delete one or more containers 110.

Containers 110 implement OS-level virtualization, wherein an abstraction layer is provided on top of kernel 224 of an operating system 116 of host 108. The abstraction layer supports multiple containers 110, with each container including an application 220 and its dependencies. Each container 110 runs as an isolated process in userspace on host operating system 116 and shares kernel 224 with other containers 110. For example, each container $110_i$ (from $110_1$ to $110_n$) shares kernel 224, Each container 110 relies on kernel's 224 functionality to make use of resource isolation (CPU, memory, block 110, network, etc.) and separate namespaces to completely isolate the application's view of the operating environments.

Traditionally, virtual machines (VMs) have been extensively used in cloud computing as they ensure isolation and limits on the resources. Container based virtualization has emerged as an alternative to VMs for deploying applications in the cloud and simplified deployment of the applications. Even though this has eased many tasks in the cloud, this has resulted in increasing the complexity of performance debugging.

Performance monitoring is of great importance for any system as it aids in troubleshooting a virtualized environment. As the demands of customers increase, so does the importance of providing customers with a scalable method that retrieves data from the virtualized environment and provides an easy way to analyze that data. Existing tools, such as, a monitoring tool, typically provide computation metrics for containers. However, existing, tools do not provide computation metrics for applications running on the containers. For example, because containers are typically short-lived, computation metrics directed to the containers themselves are not as important as the health of the application.

To aid in monitoring the health of an application executing, in one or more containers 110, host 108 may communicate with a performance monitor 230. In an embodiment, performance monitor 230 may reside in a separate server (not shown) that has access to the network (e.g., network 103) on which containers 110 are running. In an embodiment, performance monitor 230 can reside on the same host (e.g., host 108) on which the containers (e.g., containers 110) are created. Performance monitor 230 is configured to monitor applications running on containers 110. Conventionally, an application, such as application 220, may be executed across multiple containers 110. For example, application $220_1$ may be executed across containers $110_1$-$110_4$ and application $220_2$ may be executed across containers $110_5$-$110_7$. Performance monitor 230 monitors the host (e.g., host 108) on which a number of containers 110 (e.g., $110_1$-$110_7$ are running, Performance monitor then processes a list of containers 110 to create one or more applications (e.g., application $220_1$ and application $220_2$). As such, performance monitor 230 provides the user with health/performance information to aid the user in deciding how to optimize the resource requirements for a resource intensive application.

Figure 3:
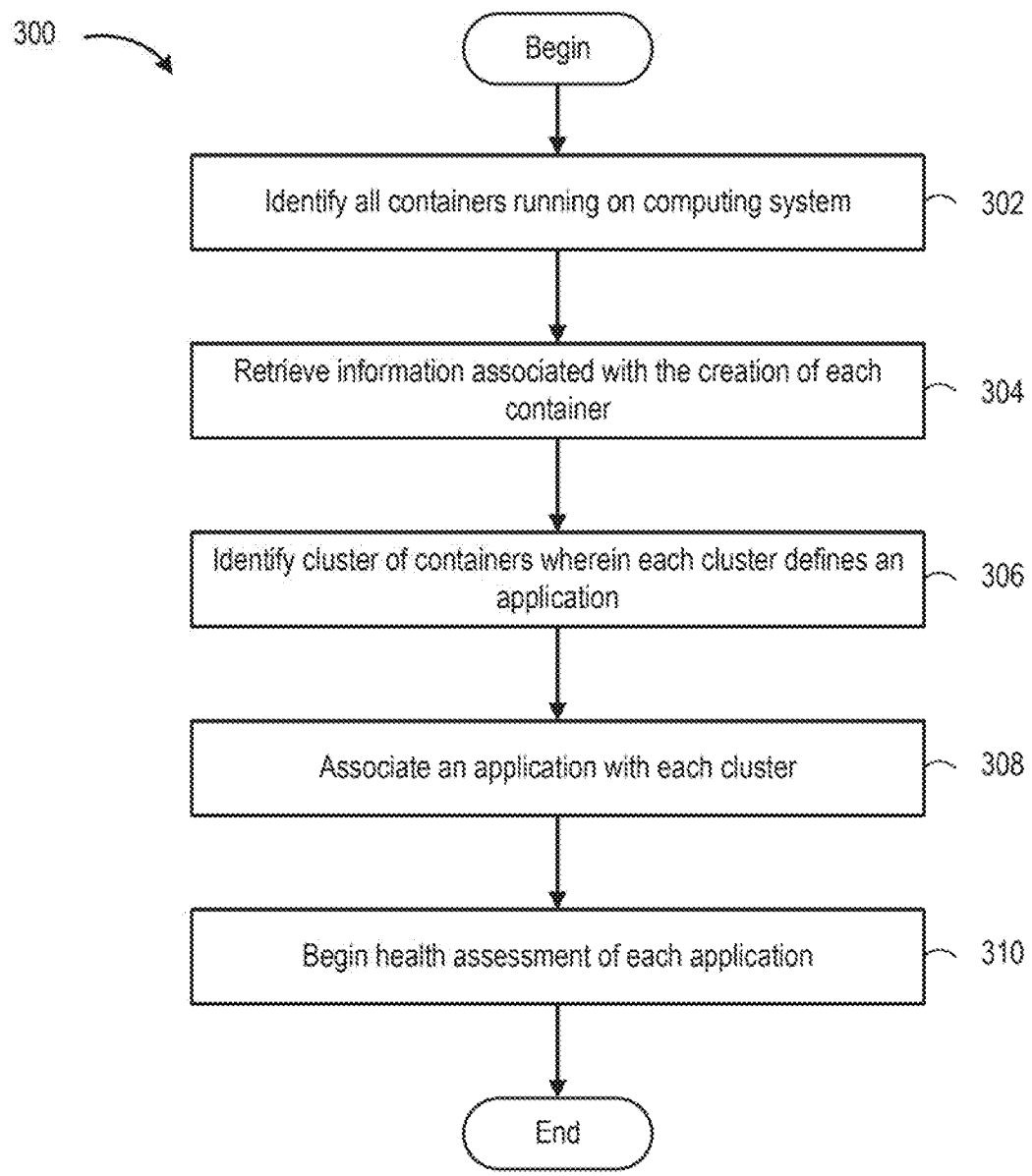
FIG. 3 is a flow diagram illustrating a method of monitoring an application executing across a plurality of containers, according to an embodiment.
Figure 4A:
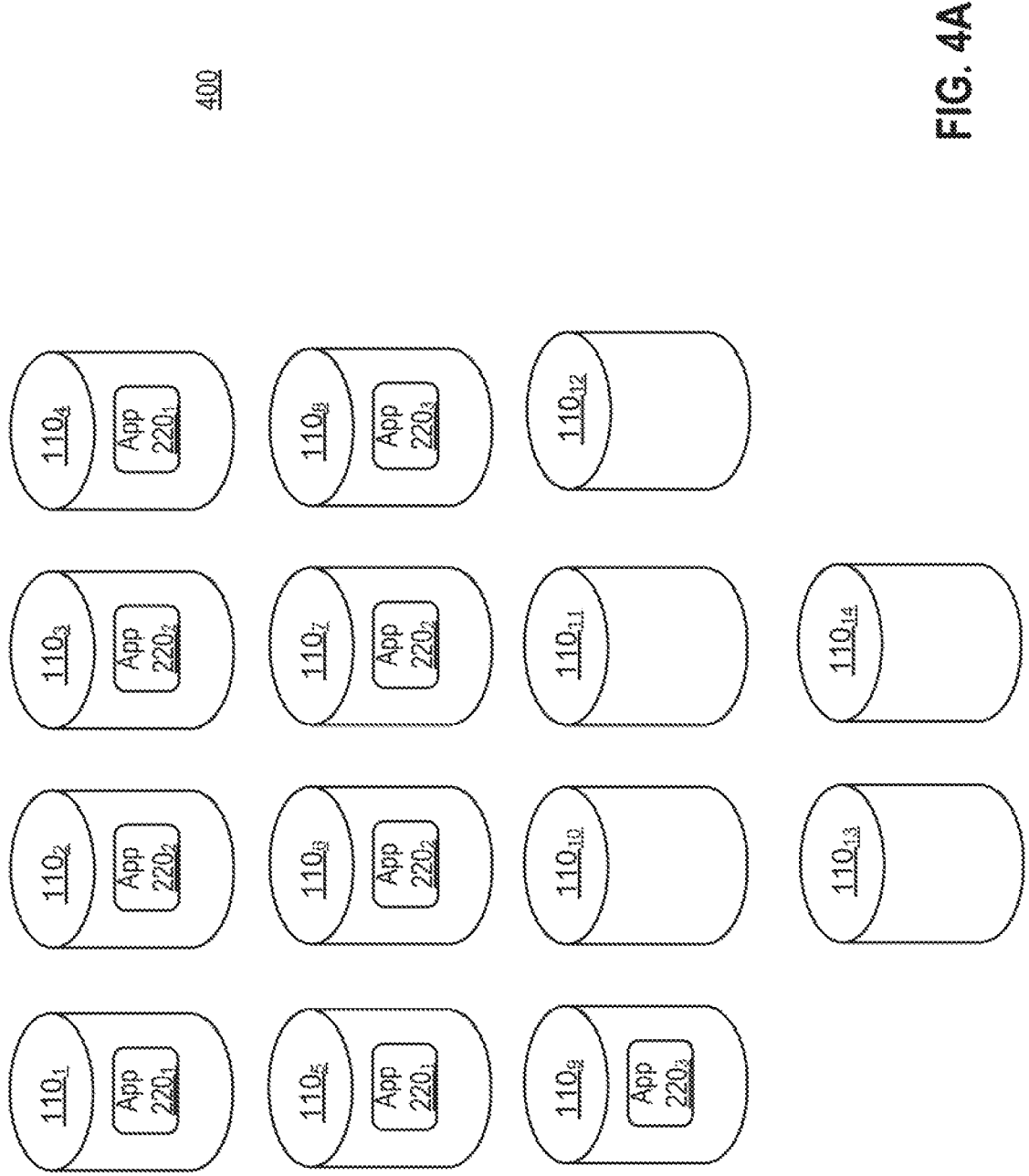
FIG. 4A is a logical block diagram illustrating a plurality of applications executing across multiple containers, according to an embodiment.

FIG. 3 is a flow diagram illustrating a method 300 of monitoring an application executing across a plurality of containers, according to an embodiment. FIG. 4A is a logical block diagram illustrating an example of an environment 400 having a plurality of containers $110_i$ and a plurality of applications 220, executing across those multiple containers $110_i$, according to an embodiment. Generally, an environment may contain n containers 110, where n is an integer greater than zero. For simplicity, in environment 400, only several containers 110 are illustrated, i.e. containers $110_1$-$110_{14}$. Each container $110_i$ has a portion of an application 220 executing thereon. For simplicity, environment 400 has three applications, application $220_1$, application $220_2$, and application $220_3$, executing across containers $110_1$-$110_{10}$). Each container $110_i$ has a portion of a respective application executing thereon.

At step 302 performance monitor 230 identifies all containers $110_i$ running on a computer system. For example, performance monitor 230 may pine agent 112 to determine the containers $110_i$ running in computer system 106. In one embodiment, performance monitor 230 may pine agent 112 to determine only those containers $110_i$ that are active (i.e., running) in computer system 106. For example, as shown in the environment 400 of FIG. 4A, containers $110_1$-$110_9$ are active, while containers $110_{10}$-$110_{14}$ are passive. In this embodiment, performance monitor 230 may ping agent 112 only to determine the containers $110_1$-$110_9$ that are active. In another embodiment, performance monitor 230 does not discriminate between active containers $110_i$ and passive containers $110_i$, rather, performance monitor 230 identifies all containers. At step 304, performance monitor 230 then retrieves information associated with the creation of each container $110_i$ running on host. For example, performance monitor 230 may request information associated with the creation of each container $110_i$ from agent 112, which provides the API endpoint for host 108. The list of containers $110_i$ and each container's $110_i$ associated creation information is then analyzed to identify links between containers.

Using the example of FIG. 4A, host 108 includes containers $110_1$-$110_{14}$. Containers $110_1$-$110_9$ are active, and containers $110_{10}$-$110_{14}$ are passive. Accordingly, using the above-mentioned embodiment, performance monitor 230 only pings agent 112 for information regarding active containers $110_1$-$110_9$, as well as their associated creation information. As illustrated, application $220_1$ executes across containers $110_1$, $110_4$, and $110_5$; application $220_2$ executes across containers $110_2$, $110_3$, $110_6$, and $110_7$, and application $220_3$ executes across containers $110_8$ and $110_9$.

Figure 4B:
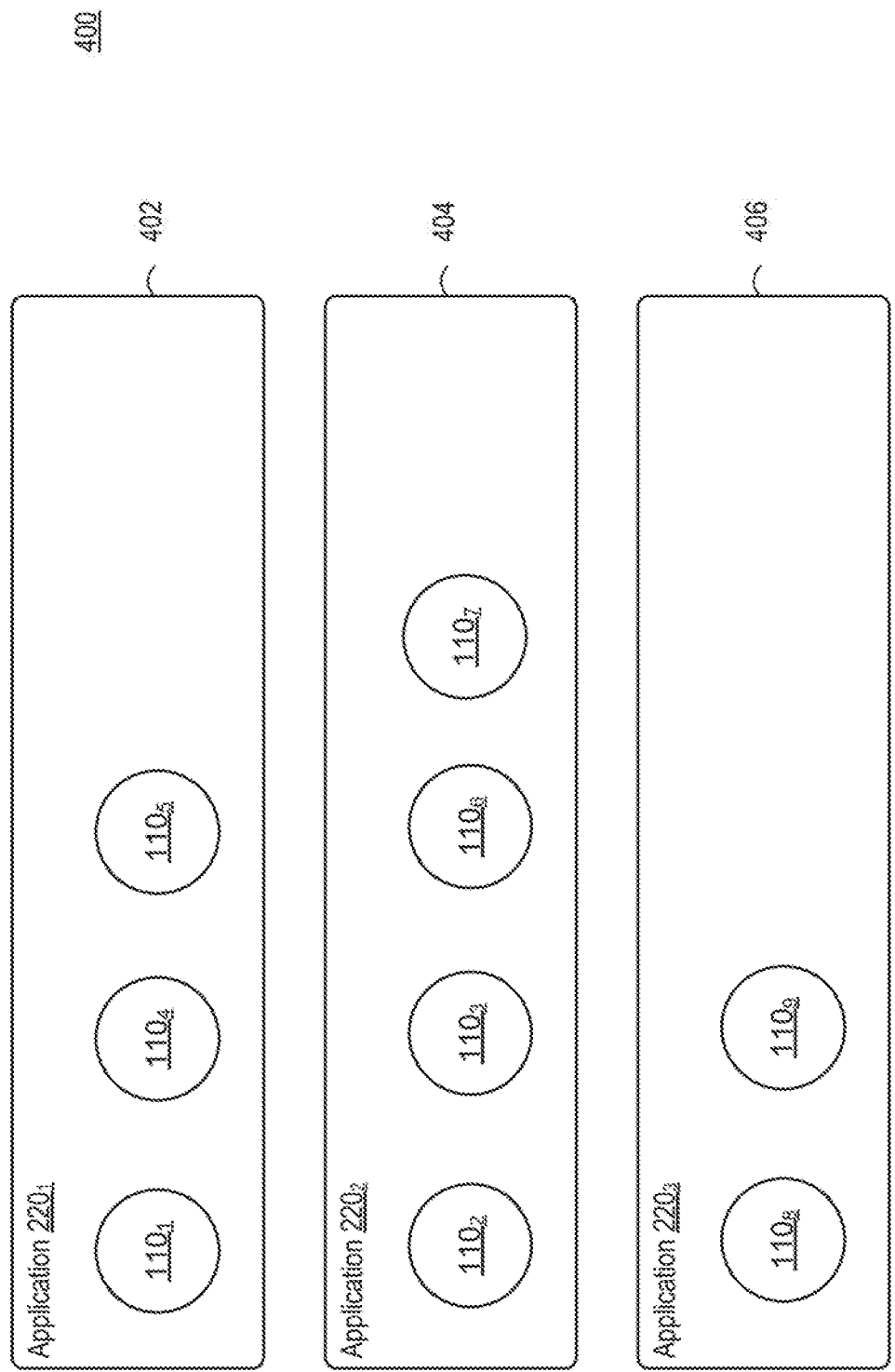
FIG. 4B is a logical block diagram illustrating the plurality of applications executing across multiple containers as shown in FIG. A, according to another embodiment.

Referring back to FIG. 3, at step 306, performance monitor 230 identifies clusters of containers 110i, wherein each cluster defines a single application $220_i$. For example, FIG. 4B illustrates the environment 400 of FIG. 4A in a different logical arrangement. FIG. 4B illustrates a cluster view of the containers 110i. Referring to FIGS. 4A and 4B simultaneously, containers $110_1$, $110_4$, and $111_5$ are grouped in to cluster 402. Cluster 402 defines application $220_1$. Containers $110_2$, $110_3$, $110_6$, and $110_7$ are grouped into cluster 404. Cluster 404 defines application $220_2$. Containers $110_8$ and $110_9$ are grouped into cluster 406. Cluster 406 defines application $220_3$.

The information associated with the creation of active containers $110_i$ help performance monitor 230 identify clusters 402-406. Clusters 402-406 are further identified by determining which containers $110_i$ communicate with each other. For example, application $120_3$ may comprise of a webserver in container $110_8$ and a database in container $110_9$. As such, container $110_8$ communicates with container $110_9$. Thus, performance monitor 230 may group containers $110_8$ and $110_9$ in the same cluster.

Figure 5:
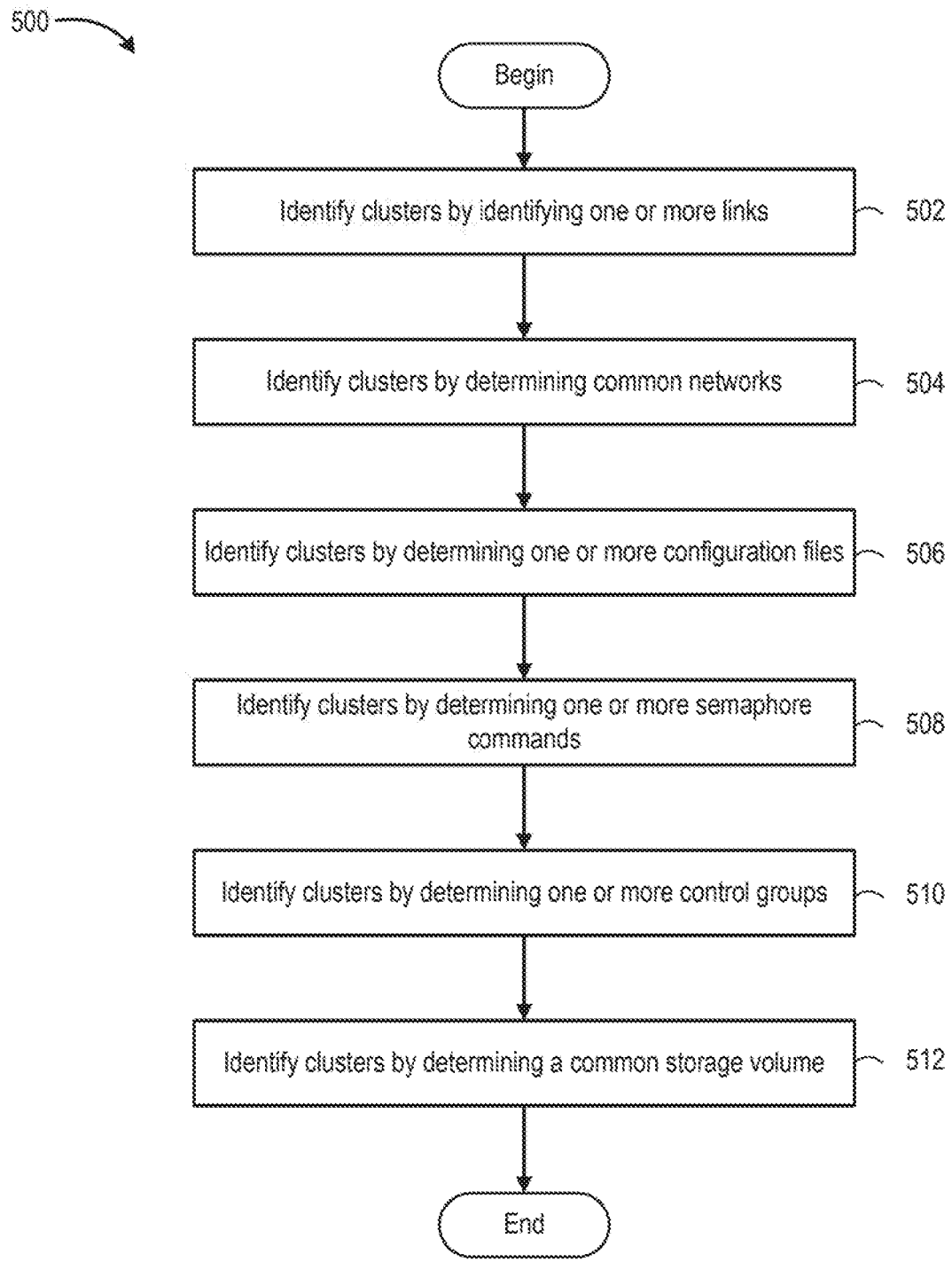
FIG. 5 is a flow diagram illustrating a method of identifying clusters of related containers, according to one embodiment.

FIG. 5 is a flow diagram illustrating a method 500 of discovering applications across multiple containers (i.e. step 304), according to one embodiment. In many cases, a single application is executed using several containers and it is useful to identify all of the containers that comprise that single application in order to be able monitor the health of the application (rather than individual containers). The steps discussed below in conjunction with FIG. 5 are not discussed in an order that limits which steps may be performed first, second, third, etc. For example, step 506 may be performed prior to or subsequent to step 504. At step 502, performance monitor 230 identifies clusters of containers $110_i$ (e.g., each cluster that is running the same application) by identifying one or more links between containers. Each link provided by the OS-level virtualization layer allows containers $110_i$ to discover each other and securely transfer information from one container $110_i$ to another. For example, when a user creates a new database container using the Docker OS-level virtualization layer, the user may enter into a command line docker run -d -name db training/postgres To link a webapp container (i.e., a separate container) to the new database container, user may enter into the command line:

---
docker run -d -P --name web --link db: db training/webapp python app.py

---

With the --link option as shown in the above command, a new database container $110_i$ is created and then linked with a new webapp container $110_i$. As such, when the performance monitor 230 accesses the retrieved creation information for containers $110_i$. The performance monitor 230 parses the information searching for "--link" to determine which containers $110_i$ are related.

At step 504, performance monitor 230 identifies clusters of containers $110_i$ that comprise individual applications by determining common networks on which the containers are running. For example, performance monitor 230 may utilize a network feature provided by the OS level virtualization layer that provides complete isolation among containers $110_i$. This feature provides the end user with control over the networks on which the applications $220_i$ are running. This is particularly useful for applications 220, that involve several containers $110_i$ running in combination. For example, Docker natively provides a "--net" tag to specify on which network a given container $110_i$ will run. Containers $110_i$ connected on the same network/bridge can communicate with one another. As such, performance monitor 230 may access the retrieved creation information, and parse the information for "--net" to determine on which network the container is running. The performance monitor 230 utilizes the network information to group containers into one or more clusters, such as those illustrated in FIG. 4a At step 506, performance monitor 230 identifies any configuration file or tool that may be provided by the OS-level virtualization layer used to configure an application's $220_i$ services. For example, Compose is a tool for Docker that is used to define and run multi-container Docker applications. With Compose, a compose configuration file is used to configure an application's $220_i$ services. As such, Compose allows the user to use a single command to create and start all application services from the configuration. Performance monitor 230 parses the creation information to locate the compose file configurations that are used to configure an application's $220_i$ services to determine which containers $110_i$ are associated with a given application.

At step 508, performance monitor 230 identifies interprocess communication among multiple containers $110_i$. Interprocess communication (IPC) is used for high performance computing. IPC allows multiple containers to share data and information through semaphores. A semaphore is a variable or abstract data type that is used to control access to a common resource by multiple processes in a concurrent system. Performance monitor 230 parses the extracted information collected from the containers and locates IPC among multiple containers by finding semaphores defined in the program code.

At step 510, performance monitor 230 identifies control groups (Cgroups) of containers $110_i$. Generally, containers $110_i$ may be made from a combination of namespaces, capabilities, and Cgroups. A Cgroup is a collection of processes that are bound by the same criteria. A given Cgroup may be associated with a set of parameters or limits. In the case of Docker OS-level virtualization, Cgroups may be formed through a "-cgroup-parent" flag, which allows a user to create and manage resources, as well as categorize containers under a common parent group. Performance monitor 230 identifies Cgroups by parsing the creation information collected from the agent 112 to locate a "-cgroup-parent" instruction. As such, performance monitor 230 identifies an application by determining which containers are associated with the same Cgroup.

At step 512, performance monitor 230 identifies which containers share the same data volume and the same image to run a given container. For example, in the Docker case, a user may enter the following instructions when creating a container:

---
docker create -v /dbdata --name dbdata training/postgres /bin/true
docker run -d --volumes-from dbdata --name db1 training/postgres The "-volume" parameter identifies the same data volume and same image to run a given container. Performance monitor 230 identifies containers $110_1$ sharing the same data volume by parsing the retrieved creation information and searching for the "-volume" flag. As such, performance monitor 230 is able to identify linked containers by determining which containers share the same data volume.

Referring back to FIG. 3, after performance monitor 230 identifies clusters of containers $110_i$, performance monitor 230 associates an application with each cluster (step 308). For example, referring to FIG. 4B, performance monitor 230 would identify application $220_1$, application $220_2$, and application $220_3$ as applications in environment 400. As such, performance monitor 230 may create a list of applications to present to the user. In some embodiments, performance monitor 230 may create a graph of all containers $110_i$ running on the host 108, and their associated application $220_i$.

At step 310, performance monitor 230 generates a health assessment of each application running on host 108. Once all clusters are discovered, and the associated applications $220_i$ are identified, the performance monitor 230 determines the health of each application $220_i$, based on at least metrics collected from the identified cluster of containers. This enables an end user to pinpoint service methods that consume maximum resources e.g., CPU, disk, or network time) for each request. For example, a simple web application may comprise a web server, a database server, and a load balancer. Assume that the web server is running on a first container, the database server executes on a second container, and the load balancer is run on a third container. The first, second, and third containers define a duster that was identified in step 304 above. Performance monitor 230 assesses the health of the overall cluster, i.e. the application. As such, performance monitor 230 may determine whether the application consumes an excessive amount of host 108 resources. For example, a given application may consume 90% of host's 108 memory resources. This information is provided to the end user, such that the end user can take action.

Monitoring containerized applications can maximize the efficiency of the underlying host. Without proper monitoring, for example, servers and cloud infrastructure may be unusable due to the load of resource-starved containers. The above method provides a way to maximize the resource utilization of the infrastructure of the host without sacrificing the performance of any applications of microservices. The collection of application metrics may be used subsequently to automate a large part of capacity planning.

The above process of monitoring applications of a host may be used on several occasions. For example, the application-centric information can be used for resource-aware scheduling and auto-scaling, i.e. the information can be used to start new containers on hosts where the load is less, and stop containers on hosts where the performance load is high. The performance monitor 230 helps user and administrators to investigate the applications, and manage the containers such that each container has the resources it needs, and that all hosts are running at their most efficient capacity. In another example, the monitoring process may be useful in the automated monitoring and alerting of applications. For example, an alerting system can be made that raises alerts and informs the user when performance for containers on a host is too high.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data, which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) --CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of monitoring an application executing across a plurality of containers in a computing system, comprising:
    requesting a list of containers created on a computing system;
    retrieving information associated with a creation of each container in the list;
    parsing the information associated with each container in the list to identify a cluster of related containers that are running the application; and
    assessing a health of the application executing on the cluster of related containers based on metrics collected from the cluster of related containers, wherein parsing the information associated with each container in the list to identify the cluster of related containers comprises identifying the cluster of related containers by parsing the information to search for at least one of:
    a link command,
    a common network,
    creation of a configuration file for the application,
    a semaphore command related to one or more containers,
    a command creating a control group, or
    containers that use a same storage volume.

2. The method of claim 1, wherein requesting the list of containers created on the computing system comprises:
    filtering the list of containers created on the computing system to include only those containers that are active on the computing system.

3. The method of claim 1, wherein parsing the information associated with each container in the list to identify the cluster of related containers comprises:
    identifying the cluster of related containers by parsing the information to search for a link command.

4. The method of claim 1, wherein parsing the information associated with each container in the list to identify the cluster of related containers comprises:
    identifying the cluster of related containers by parsing the information to search for a common network.

5. The method of claim 1, wherein parsing the information associated with each container in the list to identify the cluster of related containers comprises:
    identifying the cluster of related containers by parsing the information to search for creation of a configuration file for the application.

6. The method of claim 1, wherein parsing the information associated with each container in the list to identify the cluster of related containers comprises:
    identifying the cluster of related containers by parsing the information to search for a semaphore command related to one or more containers.

7. The method of claim 1, wherein parsing the information associated with each container in the list to identify the cluster of related containers comprises:
    identifying the cluster of related containers by parsing the information to search for a command creating a control group.

8. The method of claim 1, wherein parsing the information associated with each container in the list to identify the cluster of related containers comprises:
    identifying the cluster of related containers by parsing the information to search for containers that use a same storage volume.

9. A computer system, comprising:
    a processor; and
    a memory storing program code, which, when executed on the process, performs a method of monitoring an application executing across a plurality of containers in a computing system, comprising:
    requesting a list of containers created on the computing system;
    retrieving information associated with a creation of each container in the list;
    parsing the information associated with each container in the list to identify a cluster of related containers that are running the application; and
    assessing a health of the application executing on the cluster of related containers based on metrics collected from the cluster of related containers, wherein parsing the information associated with each container in the list to identify the cluster of related containers comprises identifying the cluster of related containers by parsing the information to search for at least one of:
    a link command,
    a common network,
    creation of a configuration file for the application,
    a semaphore command related to one or more containers,
    a command creating a control group, or
    containers that use a same storage volume.

10. The computer system of claim 9, wherein requesting the list of containers created on the computing system comprises:
    filtering the list of containers created on the computing system to include only those containers that are active on the computing system.

11. The computer system of claim 9, wherein parsing the information associated with each container in the list to identify the cluster of related containers comprises:
    identifying the cluster of related containers by parsing the information to search for a link command.

12. The computer system of claim 9, wherein parsing the information associated with each container in the list to identify the cluster of related containers comprises:
    identifying the cluster of related containers by parsing the information to search for a common network.

13. The computer system of claim 9, wherein parsing the information associated with each container in the list to identify the cluster of related containers comprises:
    identifying the cluster of related containers by parsing the information to search for creation of a configuration file for the application.

14. The computer system of claim 9, wherein parsing the information associated with each container in the list to identify the cluster of related containers comprises:
    identifying the cluster of related containers by parsing the information to search for a semaphore command related to one or more containers.

15. The computer system of claim 9, wherein parsing the information associated with each container in the list to identify the cluster of related containers comprises:
 identifying the cluster of related containers by parsing the information to search for a command creating a control group.

16. The computer system of claim 9, wherein parsing the information associated with each container in the list to identify the cluster of related containers comprises:
 identifying the cluster of related containers by parsing the information to search for containers that use a same storage volume.

17. A non-transitory computer readable medium comprising instructions, which when executed in a computer system, causes the computer system to carry out a method of monitoring an application executing across a plurality of containers in a computing system, comprising:
 requesting a list of containers created on the computing system;
 retrieving information associated with a creation of each container in the list;
 parsing the information associated with each container in the list to identify a cluster of related containers that are running the application; and
 assessing a health of the application executing on the cluster of related containers based on metrics collected from the cluster of related containers, wherein parsing the information associated with each container in the list to identify the cluster of related containers comprises identifying the cluster of related containers by parsing the information to search for at least one of:
 a link command,
 a common network,
 creation of a configuration file for the application,
 a semaphore command related to one or more containers,
 a command creating a control group, or
 containers that use a same storage volume.

18. The non-transitory computer readable medium of claim 17, wherein requesting the list of containers created on the computing system comprises:
 filtering the list of containers created on the computing system to include only those containers that are active on the computing system.

19. The non-transitory computer readable medium of claim 17, wherein parsing the information associated with each container in the list to identify the cluster of related containers comprises:
 identifying the cluster of related containers by parsing the information to search for a link command.

20. The non-transitory computer readable medium of claim 17, wherein parsing the information associated with each container in the list to identify the cluster of related containers comprises:
 identifying the cluster of related containers by parsing the information to search for a common network.

* * * * *